(12) United States Patent
Hirsch et al.

(10) Patent No.: US 6,666,629 B2
(45) Date of Patent: Dec. 23, 2003

(54) PROCESS FOR CONVEYING GRANULAR SOLIDS

(75) Inventors: Martin Hirsch, Friedrichsdorf (DE); Stuart Sneyd, Frankfurt am Main (DE); Lothar Formanek, Frankfurt am Main (DE)

(73) Assignee: Outokumpu Oyj, Espoo (FI)

(*) Notice: Subject to any disclaimer, the term of this patent is extended or adjusted under 35 U.S.C. 154(b) by 0 days.

(21) Appl. No.: 10/114,333

(22) Filed: Apr. 2, 2002

(65) Prior Publication Data

US 2002/0146291 A1 Oct. 10, 2002

(30) Foreign Application Priority Data

Apr. 4, 2001 (DE) .......................... 101 16 892

(51) Int. Cl.⁷ .............................. B65G 53/00
(52) U.S. Cl. .................. 406/197; 406/93; 406/194
(58) Field of Search .................... 406/93, 94, 95, 406/194, 197

(56) References Cited

U.S. PATENT DOCUMENTS

| | | |
|---|---|---|
| 2,684,868 A | 7/1954 | Berg |
| 2,684,872 A | 7/1954 | Berg |
| 2,684,873 A | 7/1954 | Berg |
| 2,750,181 A * | 6/1956 | Qusgg |
| 2,978,279 A | 4/1961 | Bergstrom |
| 3,106,429 A | 10/1963 | Paxton |
| 3,389,076 A * | 6/1968 | Oldweiler .................. 208/127 |
| 3,874,739 A * | 4/1975 | Mitchell ....................... 406/94 |
| 4,327,055 A | 4/1982 | Luckenbach et al. |
| 4,444,532 A | 4/1984 | Hackler et al. |

FOREIGN PATENT DOCUMENTS

EP 0 159 751 10/1985

* cited by examiner

Primary Examiner—Joseph A. Dillon
(74) Attorney, Agent, or Firm—Herbert Dubno

(57) ABSTRACT

A process of continuously conveying granular solids from a first zone with a pressure of 4 to 16 bar through a descending line and via an ascending line to a second zone with a pressure which is lower than in the first zone by 3 to 15 bar, by means of a gaseous medium. To ensure that the pressure between two regions can be reduced at low cost and with little maintenance effort when continuously conveying granular solids, a gaseous medium is injected into a tube through an upwardly directed nozzle at the point where the granular solids are conveyed through a descending line into an ascending line.

6 Claims, 2 Drawing Sheets

PROCESS FOR CONVEYING GRANULAR SOLIDS

FIELD OF THE INVENTION

This invention relates to a process for continuously conveying granular solids from a first zone at a pressure of 4 to 16 bar through a descending line and via an ascending line to a second zone with a pressure which is lower than that in the first zone by 3 to 15 bar, by means of a gaseous medium.

BACKGROUND OF THE INVENTION

In a direct-reduction plant, the granular solids, e.g. direct-reduced iron, are brought from an elevated pressure to ambient pressure for further processing in a plant. In this plant, hot direct-reduced iron is conveyed from a fluidized-bed reactor to a pressurized cyclone, from which the granular solids are discharged downwards via a storage bin through a descending line. Inert gas is introduced into the descending line.

The descending line is usually connected by a valve with an ascending line through which the granular solids are conveyed upwards into an impact pot by supplying inert gas into the ascending line. From the impact pot, the solids are introduced into a briquetting bin and inert gas is also introduced. Due to the continuous supply of fine-grained solids, a column of these solids is formed in the descending line and forms a pressure barrier.

When the valve is used, the point of transition from the descending line to the ascending line requires much effort and maintenance, as due to the temperature level and the coarse surface of the granular solids the seals and the closure body are subjected to a high degree of wear and therefore must be replaced quite often.

In U.S. Pat. No. 2,684,873, fine-grained solids are introduced into an inflow tank, the amount supplied again being regulated by means of a valve. In the inflow tank, a supply of fine-grained solids is formed, into which extends a tube through which the solids are transported into a tank disposed at a higher level. A line pressurizing the inflow tank opens into the inflow tank, whereby the solids are transported through the tube into the tank disposed at a higher level.

This known process likewise uses valves for regulating the inflow of solids. For larger amounts of solids to be transported, the inflow tank must be dimensioned correspondingly large, which makes this apparatus also very complex and expensive.

OBJECT OF THE INVENTION

It is the object of the invention to provide an improved process for conveying granular solids whereby the pressure between two regions can be reduced inexpensively and with little maintenance of the parts of the apparatus.

SUMMARY OF THE INVENTION

In accordance with the invention, this object is achieved in that the inflow of the gaseous medium is effected through an upwardly directed nozzle at the point at which the descending line opens into the ascending line.

In order to lose as little kinetic energy as possible, the nozzle orifice for the inflow of gas should expediently be disposed as close as possible to the bulk material to be transported. Due to the line of fall of the bulk material, the nozzle orifice should therefore advantageously be disposed at a distance of 0.5 to 8 times the hydraulic diameter of the nozzle orifice below the point of intersection of the tube axes.

Since the fine-grained solids flowing out of the descending line are compacted due to the column of solids above the outlet of the descending line it is advantageous to dispose auxiliary nozzles for loosening up the solids around and along the pressure line.

It is particularly advantageous when the solids weight in the ascending line lies in the range from 0.3 to 0.8 times the bulk weight, preferably in the range of 0.4 to 0.7 times the bulk weight.

With a limited overall height it is preferable to convey the solids via a multi-stage decrease in pressure.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
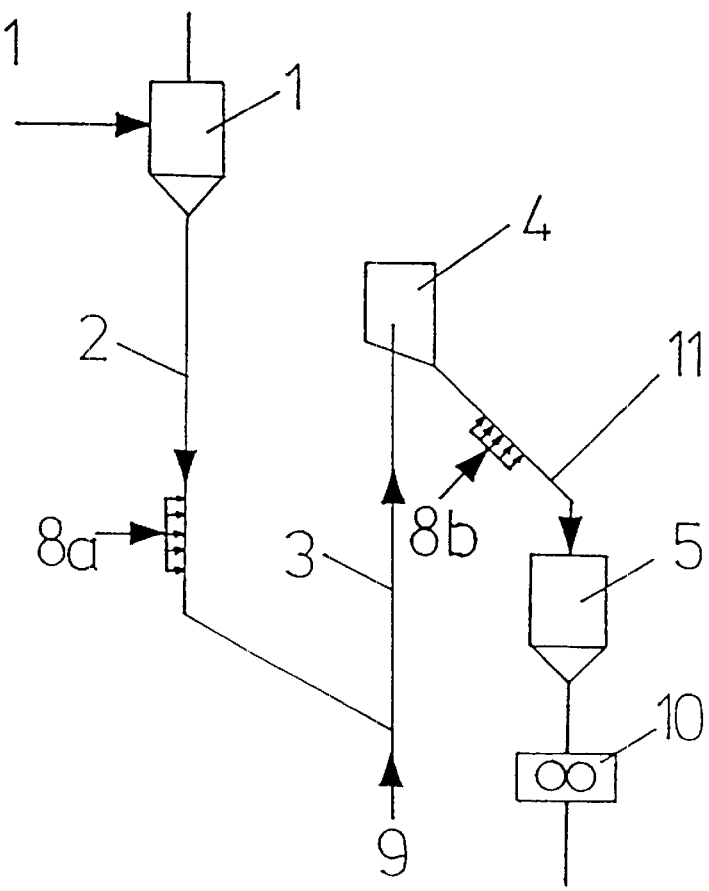
FIG. 1 is the flow diagram of the process.
Figure 2:
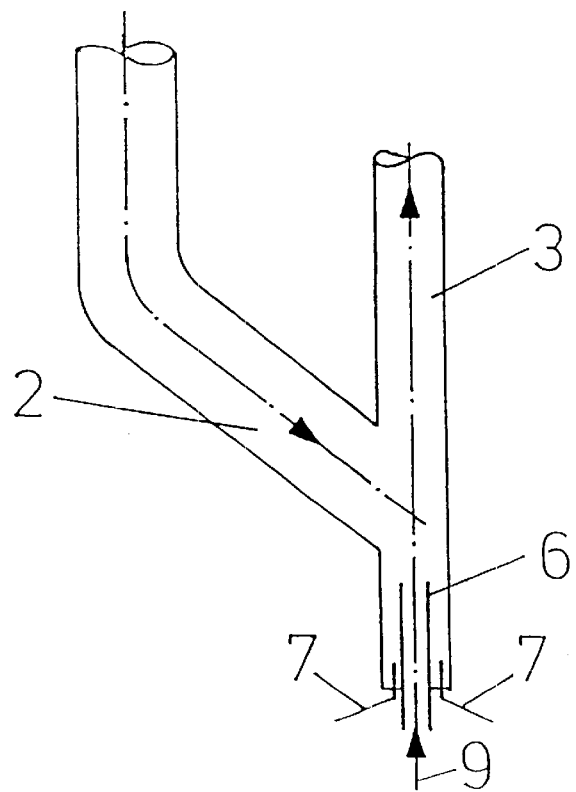
FIG. 2 is a detailed representation of a portion of the apparatus of FIG. 1.

Hot solids are conveyed from a heater into a cyclone 1 at a temperature of 650° C. to 800° C. This cyclone 1 is at a pressure of 4 to 16 bar. The fine-grained solids are discharged downwards via a descending line 2. Into the descending line 2, inert gas 8a, e.g. nitrogen, is introduced in order to flush out the reduction gas.

Downstream of the descending line 2, the solids are conveyed upwards into an impact pot 4 by means of an ascending line 3 by supplying a carrier gas at a nozzle 9, e.g. nitrogen. In the impact pot 4 the pressure lies in the range from 1 to 2 bar. From the impact pot, the solids are introduced into a briquetting bin 5 and then into a briquetting press 10 by supplying the inert gas at 8b.

Due to the continuous inflow of fine-grained solids, a column of these solids is formed in the descending line 2 and represents a pressure barrier. This column of solids has a height between 2 and 15 m, and the height thereof can be measured by means of a position meter. The column can be regulated by downwardly draining the solids from the column.

The flow of solids through the descending line 2 depends on the inert gas inflow at 8a, which at the same time influences the height of the solids column in the descending line 2. The pressure at the point where the descending line 2 opens into the ascending line 3 is 4 to 16 bar.

Below the point of intersection of the center line of the descending line 2 with the center line of the ascending line 3, carrier gas 9 is injected via a nozzle 6 opening centrally and axially into the ascending line 3. The pressure at the nozzle orifice 6 is by 0.5 to 1.5 bar higher than the pressure in the cyclone 1. Via the ascending line 3, the solids are conveyed into an impact pot 4, in which the pressure is 1 to 2 bar. The height of the ascending line from the orifice of the descending line 2 to the overflow bin or impact pot 4 is 10 to 50 m. The diameter of the ascending line 3 may be between 0.2 and 1.5 m.

Around the nozzle orifice 6, a plurality of auxiliary nozzles 7 are disposed, which loosen up the solids and transport the same from the nozzle orifice 6 into the range of influence of the carrier gas 9. The same carrier gas is passed through the nozzles 6 and 7.

Figure 3:
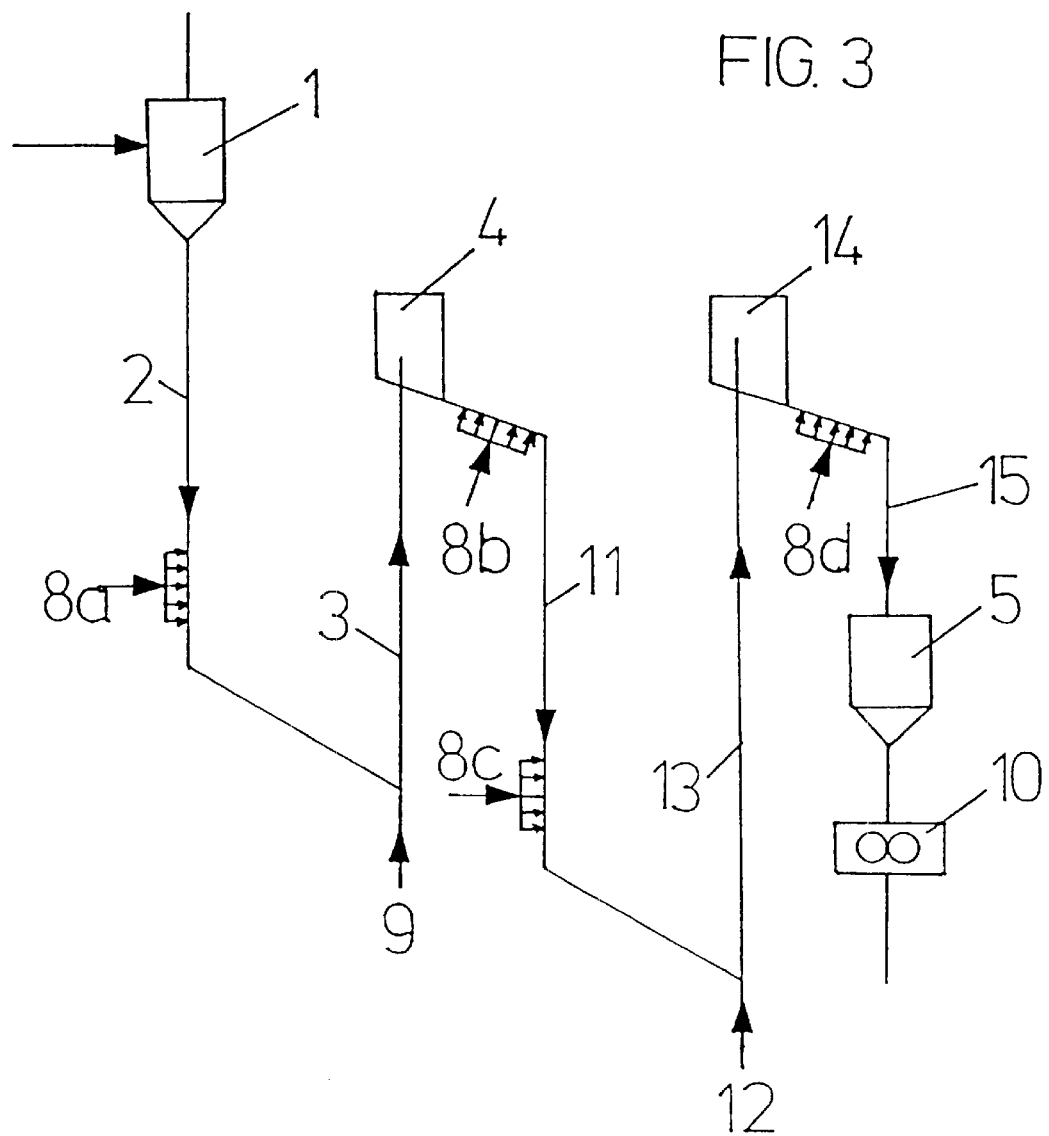
FIG. 3 is a flow diagram of a multi-stage process according to the invention.

FIG. 3 shows the conveyance of the solids with a multistage decrease in pressure. Hot solids are conveyed from a heater into a cyclone 1 at a temperature of 650° C. to 800° C. In this cyclone 1, a pressure of 4 to 16 bar exists. The fine-grained solids are discharged downwards through a descending line 2. Inert gas 8a, e.g. nitrogen, is introduced into the descending line, in order to flush out the reduction gas.

Downstream of the descending line 2, the solids are conveyed upwards into an impact pot 4 by means of an ascending line 3 by supplying carrier gas 9, e.g. nitrogen. In the impact pot 4 the pressure is in the range from 2 to 8 bar. From the impact pot 4, the solids are conveyed into a second descending line 11 by supplying further inert gas at 8b.

Downstream of the descending line 2, the solids are conveyed upwards into another impact pot 14 by means of a further ascending line 13 by the supply of carrier gas at 12, e.g. nitrogen. In this impact pot 14 the pressure is in the range from 1 to 2 bar. From the impact pot, the solids are introduced into a briquetting bin 5 and then into a briquetting press 10 by the supplying of inert gas at 8b.

EXAMPLE 1

To the cyclone 1, 64 t/h direct-reduced iron is supplied with 40,000 $m^3/h(STP)H_2$. The temperature is 730° C., the pressure is 4.5 bar. Upon separation of $H_2$ and solids, the solids are discharged via the descending line 2, which has a diameter of 0.5 m and a length of 16 m. Via line 8a, 70 $m^3/h(STP)N_2$ are supplied for flushing the $H_2$ contained in the void volume. In the ascending line 3 with a diameter of 0.25 m and a length of 25 m, the solids are conveyed into the impact pot 4 via line 3 by adding 150 $m^3/h(STP)N_2$ through the nozzles 6 and 7. In doing so, the pressure is reduced to 1 bar. From the impact pot, the solids are introduced into a briquetting bin 5 and then into a briquetting press 10 by supplying 30 $m^3/h(STP)N_2$ at 8b.

EXAMPLE 2

To the cyclone 1, 64 t/h direct-reduced iron is supplied with 40,000 $m^3/h(STP)H_2$. The temperature is 730° C., the pressure is 4.5 bar. Upon separation of $H_2$ and solids, the solids are discharged via the descending line 2, which has a diameter of 0.5 m and a length of 8 m. Via line 8a, 50 $m^3/h(STP)N_2$ are supplied for flushing the $H_2$ contained in the void volume. In the ascending line 3 with a diameter of 0.25 m and a length of 10 m, the solids are conveyed into the impact pot 4 via line 3 by adding 150 $m^3/h(STP)N_2$ through the nozzles 6 and 7, in which impact pot a pressure of 3.0 bar is obtained. From the impact pot, the solids are discharged via the descending line 11 which has a diameter of 0.5 m and a length of 8 m. Via lines 8b and 8c, 50 $m^3/h(STP)N_2$ are supplied for further removing the $H_2$ contained in the void volume.

In the ascending line 13 with a diameter of 0.25 m and a length of 15 m, the solids are conveyed into the impact pot by adding 100 $m^3/hN_2(STP)$ 12 via line 13. The impact pot has a pressure of 1 bar. From this impact pot, the solids are introduced into a briquetting bin 5 and then into a briquetting press 10 by supplying 30 m3/h $N_2$ STP at 8d.

We claim:

1. In a process for continuously conveying granular solids from a first zone with a pressure of 4 to 16 bar through a descending line and via an ascending line to a second zone with a pressure which is lower than in the first zone by 3 to 15 bar, by means of a gaseous medium, the improvement which comprises introducing gaseous medium through an upwardly directed conveying nozzle into said ascending line substantially at a point at which the descending line opens into the ascending line to entrain solids descending in said descending line upwardly in said ascending line; and maintaining a solids weight in the ascending line at 0.3 to 0.8 times a bulk weight of the solids.

2. The improvement defined in claim 1 wherein a nozzle orifice of the conveying nozzle for the inflow of the gaseous medium is disposed at a distance of 0.5 to 8 times a hydraulic diameter of the nozzle orifice below a point of intersection of tube axes of the ascending and descending lines.

3. The improvement defined in claim 2 wherein at least one auxiliary nozzle for introduction of the gaseous medium into sad ascending line is disposed alongside the conveying nozzle.

4. The improvement defined in claim 1 wherein the solids weight in the ascending line is maintained at 0.4 to 0.7 times the bulk weight.

5. The improvement defined in claim 1, wherein the solids are conveyed via at least two descending lines and via at least two ascending lines.

6. A method of conveying direct-reduced granular solids from a cyclone at a pressure of 4 to 16 bar, comprising the steps of:

(a) passing said granular solids downwardly from said cyclone through a descending line in which a column of 2 to 15 m in height of the solids is maintained;

(b) feeding the granular solids from said descending line into an ascending line at a point of intersection of said descending line with said ascending line;

(c) maintaining a solids weight in the ascending line at 0.3 to 0.8 times a bulk weight of the solids;

(d) introducing a carrier gas into said ascending line through a conveying nozzle disposed at a distance of 0.5 to 8 times a hydraulic diameter of the conveying nozzle below said point of intersection and opening upwardly and axially into said ascending line to entrain solids upwardly in said ascending line;

(e) conveying said solids upwardly in said ascending line into an impact pot maintained at a pressure 3 to 15 bar lower than the pressure in said cyclone ; and (f) discharging said solids downwardly from said impact pot.

* * * * *